Figure 1:
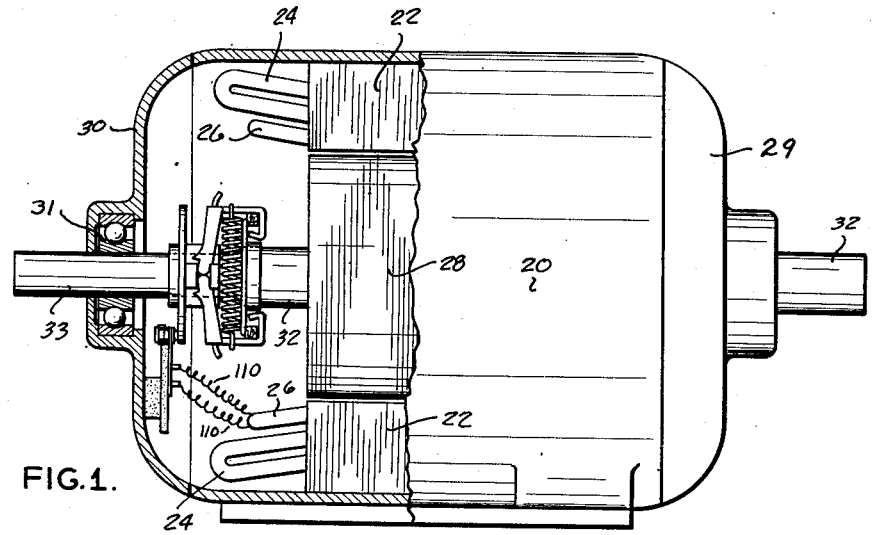

Jan. 16, 1951        E. BRETCH        2,538,410

DYNAMOELECTRIC MACHINE

Filed Sept. 3, 1946        3 Sheets-Sheet 1

INVENTOR
EDWARD BRETCH

BY Roy M. Eilers
ATTORNEY

Jan. 16, 1951  E. BRETCH  2,538,410
DYNAMOELECTRIC MACHINE
Filed Sept. 3, 1946  3 Sheets-Sheet 2

INVENTOR
EDWARD BRETCH
BY Roy M. Eilers
ATTORNEY

Jan. 16, 1951        E. BRETCH        2,538,410

DYNAMOELECTRIC MACHINE

Filed Sept. 3, 1946                             3 Sheets-Sheet 3

INVENTOR
EDWARD BRETCH
BY Roy M. Eilers
ATTORNEY

Patented Jan. 16, 1951

2,538,410

UNITED STATES PATENT OFFICE 2,538,410

DYNAMOELECTRIC MACHINE

Edward Bretch, St. Louis, Mo., assignor to Century Electric Company, a corporation of Missouri Application September 3, 1946, Serial No. 694,659

7 Claims. (Cl. 172—36)

This invention relates to improvements in dynamoelectric machines. More particularly, this invention relates to improvements in centrifugally operated switches for dynamoelectric machines.

It is, therefore, an object of the present invention to provide an improved centrifugally operated switch for dynamoelectric machines.

In the operation of dynamoelectric machines, it is often desirable to energize or de-energize certain windings during the starting periods of the operating cycles of the machines. In such instances it is customary to provide each of the dynamoelectric machines with a centrifugally operated mechanism which rotates with the shaft of the dynamoelectric machine and causes a movable collar to move into or out of engagement with a switch that is stationary relative to the centrifugally operating mechanism of the dynamoelectric machine. Where the dynamoelectric machines are large, a certain amount of friction can be tolerated in the centrifugally operated mechanism because it can be compensated for; but where the dynamoelectric machines are small, it is of the highest importance that all frictional forces be reduced to the irreducible minimum. The present invention provides a centrifugally operated switch for dynamoelectric machines that can be used on small dynamoelectric machines because it permits movement and interaction of its component parts with minimum frictional losses. It is, therefore, an object of the present invention to provide a dynamoelectric machine with a centrifugally operated switch wherein frictional forces are considerably reduced.

During the operation of dynamoelectric machines, the machines experience repeated starting and stopping cycles; and during those starting and stopping cycles the centrifugally-operated switches come into operation. As those switches operate the rubbing parts thereof cannot help but experience some wearing. Although such wearing cannot be completely eliminated, it can be reduced considerably. It is, therefore, an object of the present invention to reduce the amount of wear in the centrifugally-operated switches of dynamoelectric machines.

With continued operation of dynamoelectric machines equipped with centrifugally-operated switches, the occurrence of wear will act to change the relative position of the parts of the device. For example if the wearing surface of one of the switch members becomes worn, the spacing between the contacts of the switch may be changed. This would be objectionable since changes in the spacing of the contacts of the switch might cause the switch to arc over even when the switch is in the open position. Moreover the change in the spacing of the contacts might even become so serious as to completely prevent the opening of the switch. The present invention obviates this objection by providing a switch in which an over-travel action is incorporated, whereby after initial contact of the switch is made a considerable movement of the switch closing mechanism can be permitted without causing shifting or opening of the switch contacts. With this over-travel action in the switch, excessive wear can take place without any effect on the closing or opening of the switch. Such an action is not expected to be needed in the present invention to compensate for wear since wear is reduced to a minimum, but it is provided as an additional safety factor or safeguard to guarantee continued and long-lived operation of the dynamoelectric machine. It is, therefore, an object of the present invention to provide a switch which has an over-travel action whereby the switch closing mechanism can promptly close the switch and can then continue to move into switch closing position without shifting or opening the switch contacts.

The over-travel action of the switch is additionally desirable because it eliminates the need of precise adjustment of the elements of the switch relative to the elements of the centrifugally operated mechanism. This makes it possible to obtain perfect operation of the switches without hand fitting each switch. Thus the present invention decreases production costs.

In the operation of centrifugally operated switches for dynamoelectric machines, it is desirable that the contacts separate with a snap action. Where this is done the contacts are separated with such speed and suddenness that electric arcs either cannot strike or cannot sustain themselves. Thus, objectionable arcing in the switch can be avoided. The present invention obviates such arcing by providing two pivot members that act as a toggle and snap the switch elements into and out of contact. It is, therefore, an object of the present invention to provide a centrifugally operated switch that has pivot members which act as a toggle to provide a snap action for the switch.

Other objects and advantages of the present invention should become apparent from an examination of the drawing and accompanying description.

In the drawing and accompanying description a preferred embodiment of the invention is shown and described but it is to be understood that the drawing and accompanying description are for the purposes of illustration only and do not limit the invention, and that the invention will be defined by the appended claims.

Figures 2, 3:
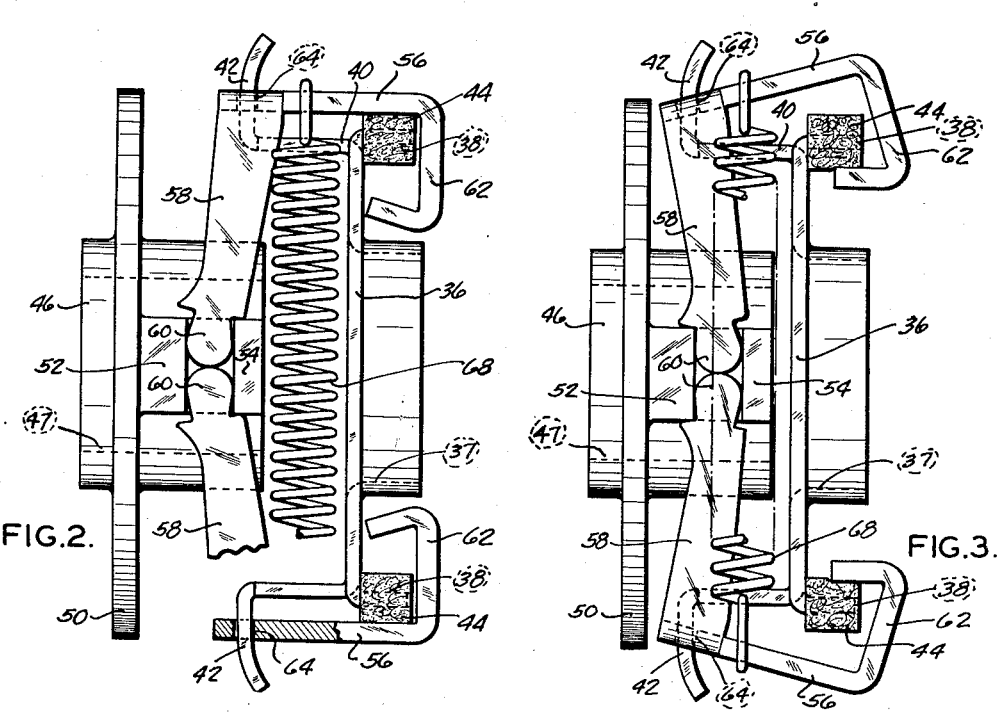
Figure 4:
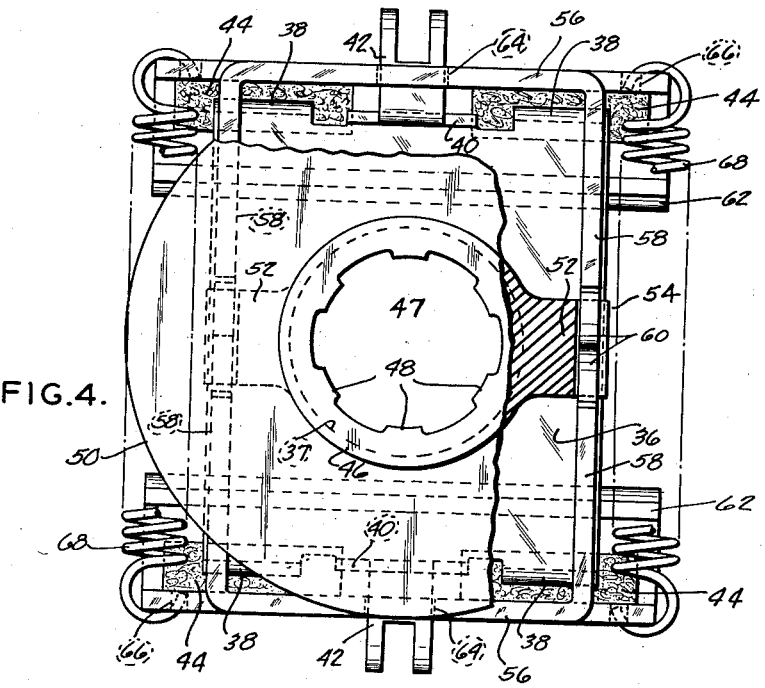
Figure 5:
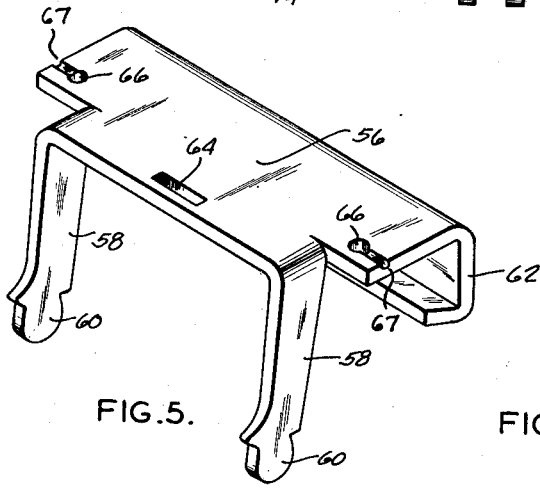
Figure 6:
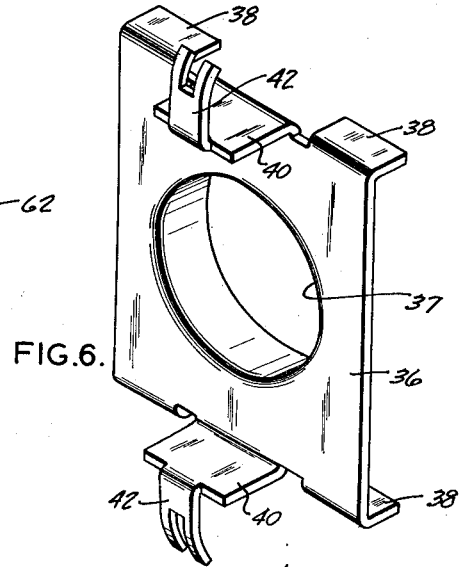
Figure 7:
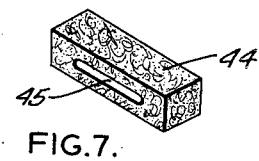
Figure 8:
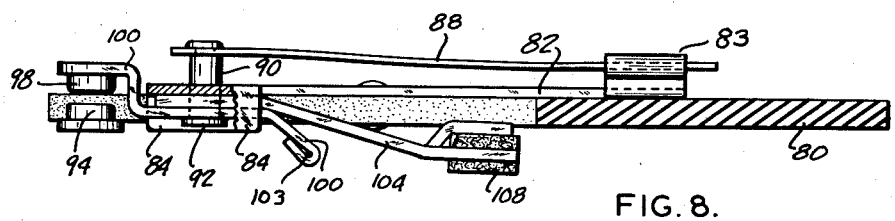
Figure 9:
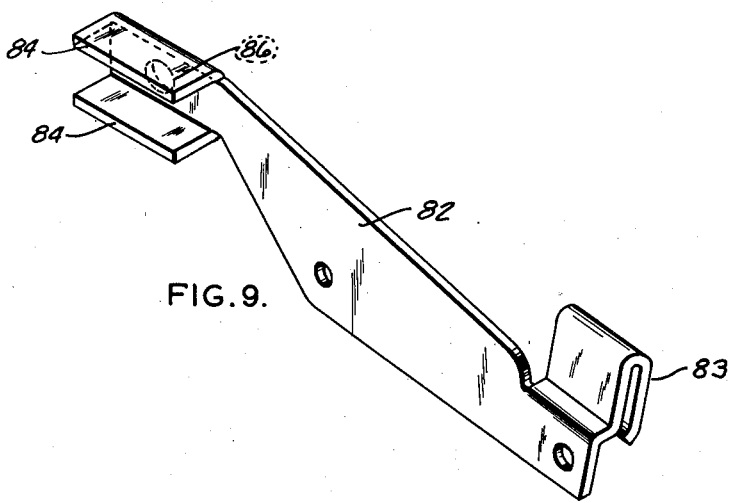
Figure 10:
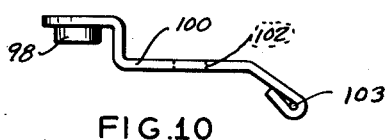
Figure 12:
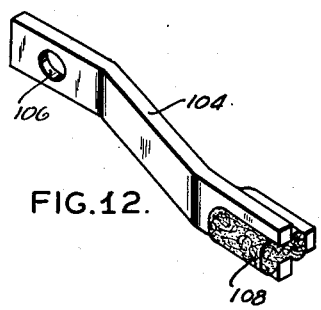
Figure 11:
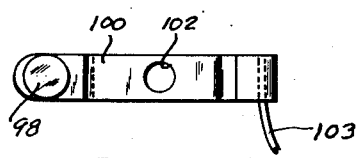

In the drawing Fig. 1 is a partially sectioned side elevational view of a dynamoelectric machine in which the centrifugally-operated switch of the present invention is incorporated, Fig. 2 is a partially sectioned side elevational view of the centrifugally-operated mechanism of the present invention in the position it assumes when the dynamoelectric machine of Fig. 1 is at rest or is running at slow speed, Fig. 3 is a side elevational view of the centrifugally-operated mechanism of Fig. 2 in the position that mechanism assumes when the dynamoelectric machine of Fig. 1 is running at full speed, Fig. 4 is a partially sectioned end view of the centrifugally-operated mechanism of Fig. 2, Fig. 5 is a perspective view of one of the weights used in the centrifugally-operated mechanism of Fig. 2, Fig. 6 is a perspective view of the guiding and movement-limiting plate of the centrifugally-operated mechanism of Fig. 2, Fig. 7 is a perspective view of one of the absorbent pads used in the centrifugally-operated mechanism of Fig. 2, Fig. 8 is a partially sectioned plan view of the switch shown in Fig. 1, Fig. 9 is a perspective view of a bracket used in the switch of Fig. 8, Fig. 10 is a plan view of the movable contact of the switch of Fig. 8, Fig. 11 is a side elevational view of the movable contact shown in Fig. 10, and Fig. 12 is a perspective view of the switch arm of the switch shown in Fig. 8.

Referring to the drawing in detail, the numeral 20 generally denotes a housing for a dynamoelectric machine, as for example a single phase squirrel cage motor. Fixedly positioned within the motor housing 20 is a stator 22 with a running winding 24 and a starting winding 26; and positioned rotatably within the stator 22 is a rotor 28. The drawing does not disclose in detail the particular form and construction of the stator or rotor or the windings for the stator, because the present invention is directed to the centrifugally-operated switching device rather than the winding 26 that is controlled by the switching device.

Closing one end of the motor housing 20 is an end bell 30, and this end bell carries an anti-friction bearing 31 which cooperates with an anti-friction bearing, not shown, in the end bell 29 at the opposite end of the motor to support the rotatable shaft 32. Before the shaft 32 is mounted in the anti-friction bearings the rotor 28 and the centrifugally-operated mechanism are mounted on that shaft; and thereafter that shaft is securely attached to the anti-friction bearings by pressing the inner races of those bearings onto the ends of that shaft. The press fit between the shaft 32 and the anti-friction bearings will not only serve to control the rotation of shaft 32 but will also control axial movement of shaft 32. Thus the anti-friction bearings prevent end play of the shaft 32. Where desired, sleeve bearings can be substituted for the anti-friction bearings and in such instances the shaft 32 will be provided with a shoulder adjacent one of the bearings and will be provided with an end-play-limiting device adjacent the other bearing.

As indicated in Fig. 1, the left hand end of the shaft 32 has a section 33 of reduced diameter, and it is the section 33 of shaft 32 that is rotatably supported by the anti-friction bearing 31 in the end bell 30. The shaft section 33 of reduced diameter is provided to permit the centrifugally-operated mechanism to be secured to the larger diameter section 32 of the shaft without burring or marring the surface of the smaller diameter shaft section 33. As a result of this construction the central opening 37 of the guiding and movement-limiting plate 36 can be pressed tightly onto the larger section of the shaft 32 without contacting or marring the smaller diameter section 33 of that shaft. The plate 36 has formed thereon and projecting from one side thereof four studs 38, and it has projecting from the other side thereof two substantially plane spacing members 40 that carry bifurcated bearing members 42. The spacing members 40 and the bifurcated bearing members 42 carried thereby are oppositely disposed of the central opening 37 which receives and is tightly secured to the shaft 32. The projecting studs 38 serve to carry absorbent material such as felt, which material is in the form of pads 44 that have centrally disposed openings 45 therethrough. The openings 45 are dimensioned so the pads 44 can slip over and be supported by the projecting studs 38 of the guiding and movement-limiting plate 36.

Dimensioned to telescope over the small diameter section 33 of the shaft 32 is the collar 46 which has a central opening 47 therein. Formed on the inner surface of the opening 47 of collar 46 are axially extending ridges 48 that are dimensioned to bear lightly against the small diameter section 33 of shaft 32 and to keep the collar 46 coaxial with the small diameter section 33 of shaft 32 while preventing binding between the collar 46 and the shaft section 33. Moreover, the axially extending ridges 48 permit the reciprocation of the collar 46 along the axis of the smaller diameter section 33 of shaft 32 without "chattering." In addition, the ridges 48 permit operation of the centrifugally-operated switch in installations where considerable dirt is found. If any dirt is "breathed" into the motor housing 20 and lodges between the collar 46 and the smaller diameter section 33 of shaft 32, that dirt will be able to work itself into the spaces between the ridges 48; thus keeping itself from interfering with the reciprocating movement of collar 46. The collar 46 is provided with a wide radially-extending flange 50 that has a smooth bearing surface on the front side thereof. The collar 46 is preferably made of a hard plastic which has a smooth bearing surface against which metal, plastic, felt, or other materials can rub without the creation of appreciable frictional forces. Adjacent the rear surface of the radially-extending flange 50 of collar 46 are two spaced shoulders 52 and 54 that are integral with the hub of the collar 46.

Formed to cooperate with both the plate 36 and the collar 46 are two weights 56 which have projecting pivot arms 58 that are provided with bearing surfaces 60; and the bearing surfaces 60 are dimensioned so they will fit between the shoulders 52 and 54 of the collar 46. The bearing surfaces 60 are smoothly rounded so that, as shown in Fig. 2 and Fig. 3, they will provide a rolling contact between each other and between themselves and the shoulders 52 and 54 of the collar 46. This rolling contact will reduce the force required to move the weights 56, and will result in the creation of extremely small frictional forces. Thus, almost frictionless rotation of the weights 56 relative to each other and relative to the collar 46 is provided. Formed at the outer ends of the weights 56 are channel-like sections 62. These channel-like sections 62 are formed to permit them to telescope over the felt pads 44 carried by the projecting studs 38 on the plate 36, and are formed to permit movement of the weights 56 relative to the projecting studs 38. An opening 64 is provided adjacent the edge of each of the weights 56, and this opening is dimensioned to receive one of the bifurcated bearing members 42 of the plate 36. Also provided on the weight 56 are openings 66 and grooves 67. The openings 66 receive the ends of the springs 68 which extend between the two weights 56 and hold them in assembled relation; and the grooves 67, that are contiguous with the openings 66, serve to hold the springs 68 in the position shown in Figs. 2-4 and to prevent displacement or dislodgment of the springs 68 when the weights 56 move.

The guiding and movement-limiting plate 36 is securely fastened to the larger diameter section of the shaft 32, the collar 46 is free to reciprocate axially of the smaller diameter section 33, and the weights 56 are permitted to move relative to the plate 36 and the collar 46. In Fig. 2 the various component parts of the centrifugally-operated mechanism are shown in the positions they assume whenever the dynamoelectric machine is at rest or is running at low speed; and at that time the collar 46 is at the left hand end of its path of reciprocation, the channel-like sections 62 of the weights 56 are resting against the outer surfaces of the felt pads 44, and the weights 56 are so disposed relative to each other and to the plate 36 that the bearing surfaces 60 are to the left of a line that could be drawn between the bifurcated bearing members 42 of the plate 36. In Fig. 3 the various component parts of the centrifugally-operated mechanism are shown in the positions they assume whenever the dynamoelectric machine 20 is running at full speed; and at that time the collar 46 is at the right hand end of its path of reciprocation, the channel-like sections 62 of the weights 56 are resting against the inner surfaces of the pads 44, and the weights 56 are so disposed relative to each other and to the plate 36 that the bearing surfaces 60 are to the right of a line that could be drawn between the bifurcated bearing members 42 of the plate 36.

The plate 36, which is securely attached to the shaft 32, serves as the center of rotation for the weights 56. More particularly, the bifurcated bearing members 42 of plate 36 extend through the openings 64 of the weights 56 and serve as the centers of rotation of the weights 56. The pivot arms 58 of the weights 56 extend toward and contact each other; and the weights 56 are held in assembled relation by the conjoint action of springs 68, spaced shoulders 52 and 54, and the bifurcated bearing members 42. It will be noted that the pivot arms 58 of weights 56 constitute a toggle that forms an angle of less than one hundred and eighty (180) degrees when the dynamoelectric machine is at rest or is running at slow speed and that forms an angle greater than one hundred and eighty (180) degrees when the dynamoelectric machine is running at full speed. As the toggle moves from either of the positions of Figs. 2 and 3 toward dead center position, the distance between the outer ends of the pivot arms 58 will increase somewhat, and then the toggle moves past dead center that distance will decrease. Since the springs 68 constantly urge the pivot arms 58 toward each other, this decrease in distance between the outer ends of the pivot arms 58 will cause the bearing surfaces 60 to snap into the positions shown in Figs. 2 and 3. Moreover, since the bearing surfaces 60 are confined by and held between the shoulders 52 and 54 of collar 46, the snap action of pivot arms 58 will cause a snap action of collar 46 toward and away from the switch mechanism.

The action of the toggle in changing the distance between the outer ends of the pivot arms 58 will not detract from the ability of the springs 68 to return the weights 56 to the position shown in Fig. 2 whenever the shaft 32 of the dynamoelectric machine comes to rest. It will be noted that the grooves 67, in which the springs 68 seat, are spaced to one side of the openings 64, and thus the rotation of the weights 56 will cause the grooves 67 to move relative to the axis of the dynamoelectric machine. Moreover, it will be noted that as the weights 56 move from the position of Fig. 2 to the position of Fig. 3, the grooves 67 will rotate around the points of contact between members 42 and the openings 64 in the weights 56 and will always be spaced outwardly beyond the openings 64. Consequently, any changes in the distance between the outer ends of the pivot arms 58, caused by the toggle action of the weights 56, will be compensated for by the change in the span of the springs 68 due to spacing between the grooves 67 of the weights 56. Thus, as the weights 56 move from the position of Fig. 2 to the position of Fig. 3, the distance between the openings 64 of weights 56 will increase and then decrease, while the distance between grooves 67 of weights 56 will continue to increase and cause a continued increase in the spans of springs 68. Thus the change in the distance between the outer ends of the pivot arms 58 does not eliminate the spring pressure on the weights 56 but it does assist the snap action of those weights.

While in the position shown in Fig. 2, channel-like sections 62 of the weights 56 will bear against the outer surfaces of the felt pads 44, and the bearing surfaces 60 of the pivot arms 58 will force the collar 46 to the left and into engagement with the switch arm 104 of the switch shown generally in Fig. 1. This switch includes a support 80 of insulating material that is secured to the end bell 30 of the dynamoelectric machine housing 20. Secured to the support 80 is a guiding and supporting bracket 82 which has upstanding projections 84 at one end thereof. Formed in the end of the bracket, between the projections 84, is an opening 86. Secured to the folded end 83 of the bracket 82 and supported thereby is a resilient member 88 of elongated shape that carries a generally cylindrical projection 90 thereon. This projection extends through the opening 86 in the one end of bracket 82, it extends through the opening 102 in the movable contact 100, and it also extends through the opening 106 in the switch arm 104. The projection 90 is provided with an enlarged head 92 that is larger than the opening 102 and prevents the withdrawal of the projection 90 from the opening 106 of switch arm 104 and the opening 102 of movable contact 100, thus insuring that the switch arm 104 and the movable contact 100 will always be held in assembled relation. The movable contact 100 carries a contactor 98 which is held in register with the fixed contact 94; and the movable contact 100 also has a folded end portion to which a flexible lead 103 is secured. This lead may be secured by any suitable means to one of the conductors 110 that are shown in Fig. 1 extending to the starting winding 26. The switch arm 104 has the opening 106 adjacent one end thereof, and it has a bearing surface 108 of felt or similar material adjacent the other end thereof. Where the motor is to be used in extremely quiet atmospheres, the bearing surface 108 should be of felt or other absorbent material; but where the motor is to be used under ordinary circumstances and surroundings, the bearing surface 108 can be made of plastic or metal.

It will be noted that the end of the switch arm 104 extends beyond the projection 90, carried by the spring 88, and it terminates at a point between the contactor 98 and the opening 102 of the movable contact 100. Furthermore, it will be noted that the switch arm 104 bears against the body portion of the bracket 82 and that the bent portion of arm 104 is to the right of the projection 90; and thus when the switch arm 104 is rotated it will rotate about a point to the right of the projection 90. The point of contact of switch arm 104 with movable contact 100 will then be between the contactor 98 and the point of engagement of projection 90 with the movable contact 100. As a result the enlarged head 92 of the projection 90 will apply a force to the movable contact 100 that will tend to pull the right hand end of that contact toward the bracket 82 while the left hand end of the switch arm 104 will tend to rotate the left hand end of the movable contact 100 toward the stationary contact 94. This causes an immediate and prompt rotation of the movable contact 100 into such a position that the contactor 98 engages the stationary contact 94. Thereafter, continued movement of the switch arm 104 will move the right hand end of the movable contact 100 away from the body portion of the bracket 82; but since the point of contact of switch arm 104 with movable contact 100 is intermediate the contactor 98 and the enlarged head 92 of the projection 90, a force will always be applied to hold the contactor 98 in engagement with the contact 94. Thus the switch arm 104 can continue to move into the "on" position even after the contactor 98 is in engagement with the stationary contact 94; and it can continue this movement without any interruption of the engagement between the contactor 98 and the stationary contact 94. This is a highly desirable feature because it obviates the necessity of providing and maintaining a nice and precise adjustment of the switch relative to the rotating flange 50 of the collar 46. Furthermore, it permits extremely long operation of the device without any replacement of the bearing surface 108 or any replacement of the parts, since all wear will be more than compensated for by the over-travel action of the switch.

While in the position shown in Fig. 2, the flange 50 of the collar 46 will be in such a position that it will bear against the pad 108 of switch arm 104, causing switch arm 104 to hold the contactor 98 of movable contact 100 in engagement with the stationary contact 94. While in this position, the device permits current to pass through contacts 94 and 100 to the starting winding 26 of the dynamoelectric machine. As soon as the rotor 28 of the dynamoelectric machine gets up to speed, sufficient centrifugal force will be exerted on the weights 56 to cause them to rotate about the bifurcated bearing members 42 and to overcome the tension in the springs 68. Thereafter the channel-like sections 62 of the weights 56 will begin to move outwardly from the axis of the dynamoelectric machine; and they will continue to move outwardly until they meet and bear against the inner faces of the felt pads 44. At that time the weights 56 and the other components of the device will have the positions shown in Fig. 3. It will be noted that the pivot arms 58 and the bearing surfaces 60 of the pivot arms 58 have moved through the plane in which the bifurcated members 42 lie. In making this move, the pivot arms 58 pulled the collar 46 to the right, and thus pulled the flange 50 of collar 46 out of engagement with the pad 108 on the switch arm 104. This permits the resilient spring 88 to pull the movable contact 100 out of engagement with the stationary contact 94. Because of the toggle arrangement of the pivot arms 58, the collar 46 is snapped away from the switch arm 104 and the switch can open rapidly and avoid or minimize arcing.

In the position shown in Fig. 3, the springs 68 are extended to a greater degree than they are in Fig. 2, and thus when the rotor 28 slows to a stop the springs 68 will pull the channel-like sections 62 of the weights 56 toward each other and toward the axis of the rotor 28. By having the bifurcated members 42 lie in a plane intermediate the ends of the path of reciprocation of the bearing surfaces 60 of the arms 58, the amount of movement of the weights 56 relative to the bifurcated members 42 is reduced; and thus the frictional forces and the wear on the weights 56 and the bifurcated members 42 is reduced to a minimum. By providing the bearing surfaces 60 of the pivot arms with rounded configurations, the frictional forces between the bearing surfaces 60 themselves and between the surfaces 60 and the spaced shoulders 52 and 54 are reduced considerably. By providing the toggle arrangement of the pivot arms 58 and by providing the felt pads 44, the wear on the component parts of the device is considerably reduced and a silent operation of the device is assured.

The arrangement of the component parts is quite desirable since it reduces the number of individual elements required. In addition the arrangement of the weights is particularly desirable since it permits the rotation of the weights to act to reduce the friction of the relatively movable parts of the switch; and it also guarantees that once the weights start to move outwardly they will continue to move until they are held by the pads 44. These desirable results stem from the fact that the centrifugal force on the weights will tend to overcome the forces exerted on the weights 56 by the springs 68 and to reduce the pressure between the bearing surfaces 60 of the pivot arms. Moreover, as the channel-like sections 62 of the weights 56 move outwardly the centrifugal forces generated in them will increase and they will continue to move outwardly, without requiring any increase in the speed of rotation of the shaft 32, until they are held by the pads 44.

The bearing members 42, which are shown to be bifurcated, could be made solid if desired. The bifurcation feature is quite useful however since it permits the ends of the members 42 to be spread apart slightly after the weights 56 have been slipped over those ends; thus permitting the centrifugally-operated mechanism to be held in assembled relation even before the springs 68 are attached to the weights 56.

Whereas the drawing and accompanying description have shown and described a preferred embodiment of the invention, it should be obvious to those skilled in the art that various changes can be made in the form of the invention without affecting the scope thereof.

What I claim is:

1. In a centrifugally-operated switch for dynamoelectric machines, a pair of weights, pivots on said weights, a channel-shaped section on each of said weights, means that projects into the channel section of each of said weights and limits movement of said weights toward or away from the axis of said dynamoelectric machine, pads of absorbent material carried on said means to bear against said channel sections of said weights, resilient means biasing said weights inwardly toward the axis of said dynamoelectric machine, a collar axially movable relative to the shaft of said dynamoelectric machine, and a switch arm that is engageable by said collar.

2. In a centrifugally-operated switch for dynamoelectric machines, a pair of weights, pivots on said weights, a channel-shaped section on each of said weights, an opening in each of said weights, a member with projections thereon that extend into said channel sections of said weights and with pivot sections that extend into said openings of said weights, resilient means biasing said weights inwardly toward the axis of said dynamoelectric machine, a collar axially movable relative to the shaft of said dynamoelectric machine, and a switch arm that is engageable by said collar.

3. A centrifugally-operated control mechanism that is rotatable with a rotatable shaft and that comprises a supporting guide which is fixedly secured to said shaft for rotation with said shaft, a pair of weights, surfaces on said supporting guide and surfaces on said weights that interact to permit rotation of said weights relative to said supporting guide and relative to each other, each of said weights having a mass and having a pivot arm projecting from one side of said mass, the inner ends of said pivot arms being rounded and being in abutting relation, a spring that biases said masses of said weights inwardly toward said shaft, motion limiting surfaces which are engageable by said weights to hold said weights in one position whenever said shaft is at rest and to hold said weights in a second position whenever said shaft is rotating at normal speed, and an actuator which is movable relative to said shaft by the inner ends of said pivot arms, said spring and said masses of said weights being disposed to one side of said interacting surfaces on said weights and being disposed to one side of a line extending between the interacting surfaces on said supporting guide in said one and said second positions of said weights, the inner ends of said pivot arms being on the other side of said line whenever said weights are in said one position but moving through said line and to said one side thereof as said weights move to said second position, said interacting surfaces on said weights moving away from and then toward each other as said inner ends of said pivots move from the other side of said line to said one side of said line, the positioning of said spring at one side of said line causing said spring to extend continuously as said weights move from said one position to said second position and while said pivot arms move to and through said line whereby the biasing force of said spring is not diminished by the movement of said interacting surfaces on said weights toward each other.

4. A centrifugally-operated control mechanism that is rotatable with a rotatable shaft and that comprises a supporting guide which is fixedly secured to said shaft for rotation with said shaft, a pair of weights, surfaces on said supporting guide and surfaces on said weights that interact to permit rotation of said weights relative to said supporting guide and relative to each other, each of said weights having a mass and having a pivot arm, the inner ends of said pivot arms being rounded and being in abutting relation, a spring that biases said masses of said weights inwardly toward said shaft, motion-limiting surfaces which are engageable by said weights to hold said weights in one position whenever said shaft is at rest and to hold said weights in a second position whenever said shaft is rotating at normal speed, and an actuator which is movable relative to said shaft by the inner ends of said pivot arms, said spring being disposed to one side of said interacting surfaces on said weights and being disposed to one side of a line extending between the interacting surfaces on said supporting guide in said one and said second positions of said weights, the inner ends of said pivot arms being on the other side of said line whenever said weights are in said one position but moving through said line and to said one side thereof as said weights move to said second position, said interacting surfaces on said weights moving away from and then toward each other as said inner ends of said pivots move from the other side of said line to said one side of said line, the positioning of said spring at one side of said line causing said spring to extend continuously as said weights move from said one position to said second position and while said pivot arms move to and through said line whereby the biasing force of said spring is not diminished by the movement of said interacting surfaces on said weights toward each other.

5. A centrifugally-operated control mechanism that is rotatable with a rotatable shaft and that comprises a supporting guide which is fixedly secured to said shaft for rotation with said shaft, a pair of weights, surfaces on said supporting guide and surfaces on said weights that interact to permit rotation of said weights relative to said supporting guide and relative to each other, each of said weights having a mass and having a pivot arm projecting from one side of said mass, the inner ends of said pivot arms being in abutting relation, a spring that biases said masses of said weights inwardly toward said shaft, motion-limiting surfaces which hold said weights in one position whenever said shaft is at rest and hold said weights in a second position whenever said shaft is rotating at normal speed, and an actuator which is movable relative to said shaft by the inner ends of said pivot arms, said spring and said masses of said weights being disposed to one side of said interacting surfaces on said weights and being disposed to one side of a line extending between the interacting surfaces on said supporting guide in said one and said second positions of said weights, the inner ends of said pivot arms being on the other side of said line whenever said weights are in said one position but moving through said line and to said one side thereof as said weights move to said second position, the positioning of said spring at one side of said line causing said spring to extend continuously as said weights move from said one position to said second position and while said pivot arms move to and through said line.

6. A centrifugally-operated control mechanism that is rotatable with a rotatable shaft and that comprises a supporting guide which is fixedly secured to said shaft for rotation with said shaft, a pair of weights, surfaces on said supporting guide and surfaces on said weights that interact to permit rotation of said weights relative to said supporting guide and relative to each other, each of said weights having a mass and having a pivot arm, a spring that biases said masses of said weights inwardly toward said shaft, motion-limiting surfaces which hold said weights in one position whenever said shaft is at rest and hold said weights in a second position whenever said shaft is rotating at normal speed, and an actuator which is movable relative to said shaft by the inner ends of said pivot arms, said spring being disposed to one side of said interacting surfaces on said weights and being disposed to one side of a line extending between the interacting surfaces on said supporting guide in said one and said second positions of said weights, the inner ends of said pivot arms being on the other side of said line whenever said weights are in said one position but moving through said line and to said one side thereof as said weights move to said second position, the positioning of said spring at one side of said line causing said spring to extend continuously as said weights move from said one position to said second position and while said pivot arms move to and through said line.

7. A centrifugally-operated control mechanism that is rotatable with a rotatable shaft and that comprises a pair of weights, pivots on said weights, a channel-shaped section on each of said weights, a spring, stops that are held in fixed relation with said shaft and extend into the channel-shaped sections of said weights to limit movement of said channel-shaped sections toward said shaft under the action of said spring and to limit movement of said channel-shaped sections away from said shaft under the action of centrifugal forces, and absorbent material on said stops to cushion the engagement of said weights and said stops.

EDWARD BRETCH.

REFERENCES CITED

The following references are of record in the file of this patent:

UNITED STATES PATENTS

| Number | Name | Date |
|---|---|---|
| 237,655 | Wright | Feb. 8, 1881 |
| 778,248 | Junggren | Dec. 27, 1904 |
| 1,093,074 | Pillsbury | Apr. 14, 1914 |
| 1,552,589 | White | Sept. 8, 1925 |
| 1,580,160 | Persons | Apr. 13, 1926 |
| 1,926,339 | Kindl | Sept. 12, 1933 |
| 2,041,161 | Brown | May 19, 1936 |
| 2,099,050 | Chamberlain | Nov. 16, 1937 |
| 2,175,932 | Unwin | Oct. 10, 1939 |
| 2,199,232 | Taylor | Apr. 30, 1940 |
| 2,210,687 | Schaelchlin et al. | Aug. 6, 1940 |
| 2,243,577 | Pepper | May 27, 1941 |
| 2,276,467 | Cotta | Mar. 17, 1942 |
| 2,277,425 | Wiest | Mar. 24, 1942 |
| 2,305,441 | Pepper | Dec. 15, 1942 |
| 2,372,064 | Esarey | Mar. 20, 1945 |
| 2,379,945 | Wyatt | July 10, 1945 |

FOREIGN PATENTS

| Number | Country | Date |
|---|---|---|
| 15,269 of 1884 | Great Britain | Nov. 20, 1884 |
| 5,693 | Australia | Of 1932 |
| 740,632 | France | Nov. 21, 1932 |